United States Patent [19]

Müffke et al.

[11] Patent Number: 4,842,310

[45] Date of Patent: Jun. 27, 1989

[54] TUBE CONNECTION FOR THIN-WALLED SMALL-DIAMETER METAL PIPES

[75] Inventors: Walter Müffke, Wiesenbach; Günter Raschdorff, Eppelheim, both of Fed. Rep. of Germany

[73] Assignee: Mannesmann Aktiengesellschaft, Düsseldorf, Fed. Rep. of Germany

[21] Appl. No.: 145,899

[22] Filed: Jan. 20, 1988

[30] Foreign Application Priority Data

Jan. 21, 1987 [DE] Fed. Rep. of Germany ....... 3701555

[51] Int. Cl.⁴ .............................................. F16L 13/14
[52] U.S. Cl. .............................. 285/334.5; 285/382.5; 29/523
[58] Field of Search ............... 285/334.5, 382.5, 382.4; 29/523

[56] References Cited

U.S. PATENT DOCUMENTS

| | | | |
|---|---|---|---|
| 2,647,000 | 7/1953 | Colley | 285/382.5 X |
| 4,330,144 | 5/1982 | Ridenour | 285/382.5 |
| 4,531,768 | 7/1985 | Summers | 285/338 |

FOREIGN PATENT DOCUMENTS

| | | | |
|---|---|---|---|
| 475478 | 7/1951 | Canada | 285/382.5 |
| 777027 | 1/1968 | Canada | 285/382.5 |

*Primary Examiner*—Thomas F. Callaghan
*Attorney, Agent, or Firm*—Horst M. Kasper

[57] ABSTRACT

A pipe connection for thin-walled, small-diameter metal pipes, in particular for braking lines, for fuel lines, and for hydraulic lines for motor vehicles, is provided with a sleeve (3) into which is sealingly set at least one first conically flared metal pipe (1) (so-called flare according to ISO 4038) in a bore cone (25) under the compression force of a tensioning body (8, respectively, 9) resting against the flare (23).

In order to provide a pipe connection without screw parts and taking into account the narrow assembly or mounting quarters and in order to achieve a satisfactory sealing effect for the full duration of the operation of the connection, it is proposed to employ a sleeve (12) with an axially fixed annular channel (18). A radially partially thin-walled pressure bushing (15) is shifted onto the first metal pipe (1) up to resting at the flare (23). The pressure force of the flare (23) against the sealing seat (14) in axial direction is generated by a set deformation zone (20) of the pressure bushing (15), where the thin wall (21) is deformable into the axially fixed annular channel (18) of the sleeve (12) by an axial upsetting of the pressure bushing (15) into the sleeve (12).

20 Claims, 2 Drawing Sheets

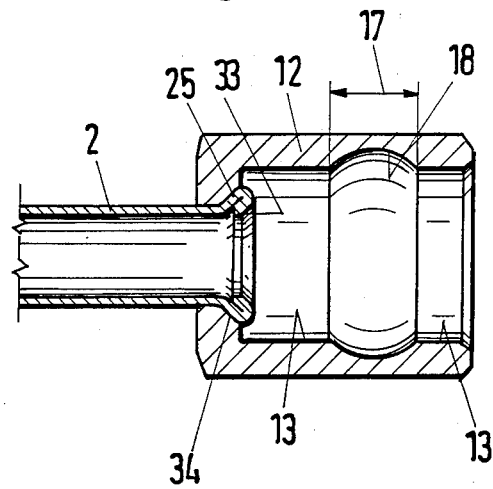
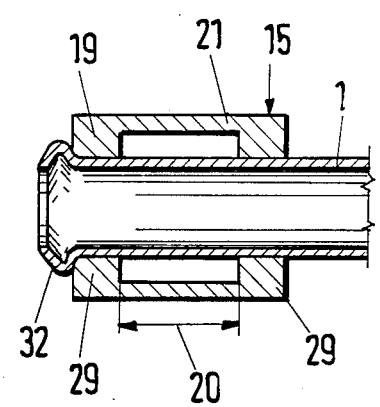
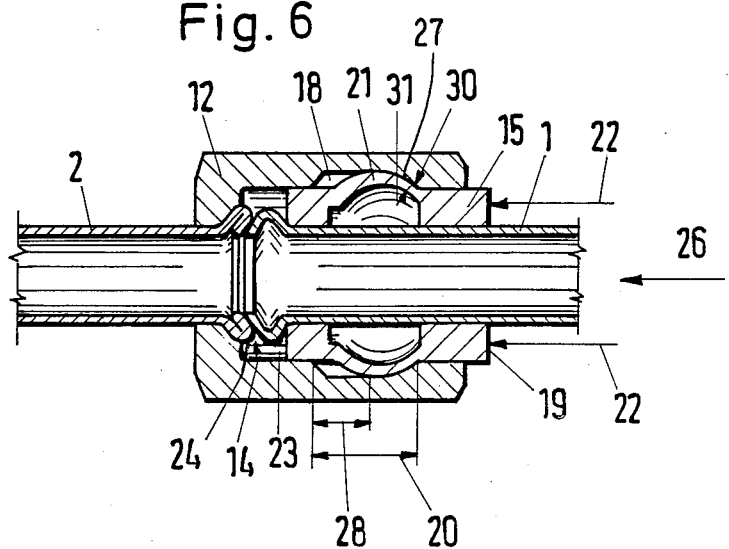

TUBE CONNECTION FOR THIN-WALLED SMALL-DIAMETER METAL PIPES

BACKGROUND OF THE INVENTION

1. Field of the Invention

The invention relates to a tube connection for thin-walled, small-diameter metal pipes and, in particular, for brake lines, for fuel lines, or for hydraulic lines, for motor vehicles, which comprise a sleeve for sealingly connecting a first conically flared metal pipe, with a flare such as ISO 4038, which is set in a bore cone under pressure force of a tensioning body resting against the flare.

2. Brief Description of the Background of the Invention Including Prior Art

Such tube connections are employed in the construction of motor vehicles at locations which are difficult to access because of narrow spaces. Such tube connections have to be formed at these locations with special tools. The higher liquid pressures in the lines and conduits require corresponding sealing seats and corresponding pressure forces on the sealing seats.

An embodiment is known to the applicant, which comprises a sleeve into which two separate sealing seats are pressed, in each case, with a first conically double-flared metal pipe and a second single-conically flared metal pipe, against the sealing seat with screw nuts. The screw nut has to be applied on the two metal pipes before the application of a flare and the screw nut has to be tightened with screwdrivers, or socket drivers. In order to assure a permanent sealing, the screw nuts are provided with a spindle shaft of a corresponding length.

In addition, German Patent Application Laid Open DE-OS 3,416,702 teaches a solution which concerns an undetachable connection between pipes for hydraulic braking plants and which addresses the problem of the required mounting space. This teaching presupposes a fitting sleeve, which is produced with threaded holes according to German Industrial Standard DIN 74235 and which fixes the starting thread depending on the pipe diameter of the brake pipe and its flare. The conventional construction starts for this purpose with a sleeve part which is provided with a profile bore without thread. The bore base of the profile bore is formed corresponding to the pipe flare, and the contour of the bore base with the front cone face of the pipe flare is axially tensioned lockingly and sealingly at the brake pipe by drawing in or tapering of the cylindrical sleeve part of the fitting on the outwardly curved outer circumference of the rear conical section of the pipe flare. At present, the conventional teaching comprises that a pressure-tight sealing connection between the pipe and the sleeve is formed by a radial rolling or squeezing in of the sleeve part. Such a radial rolling or squeezing in requires however a tool which needs substantial space, since the assembler has to actuate the tool precisely in a direction in which no space is available. In addition, a roll-off motion is particularly difficult to be performed in narrow quarters. Finally, it is disadvantageous in the context of such a teaching, that the rolling of the outer sleeve cannot be performed without straining or stressing the flared pipe itself. For this purpose, the conventional teaching in addition proposes a form-locking and tight reinforcement or armament ring for the guiding at the outer diameter of the braking pipe at the outer circumference of the pipe flare in the rolling region for supporting and/or sealing.

SUMMARY OF THE INVENTION

1. Purposes of the Invention

It is an object of the present invention to provide a pipe connection without screw parts adapted to be employed in narrow assembly or mounting quarters.

It is another object of the present invention to provide a pipe connection fitting which allows to sealingly connect pipes in narrow quarters without the use of large-dimensioned tools.

It is further object of the present invention to provide a pipe connection for flared pipes which is reliable and which provides for a satisfactory sealing effect for the full duration of the operation of the connection.

These and other objects and advantages of the present invention will become evident from the description which follows.

2. Brief Description of the Invention

In accordance with the present invention, the object is achieved by employing a sleeve with an axially fixed annular channel. In addition, a radially, partially thin-walled pressure bushing is shifted onto the first metal pipe up to resting at the flare. The pressure force of the flare against the sealing seat in axial direction can be generated by a set deformation zone of the pressure bushing, where the thin wall can be radially deformed into the axially fixed annular channel of the sleeve by an axial upsetting of the pressure bushing into the sleeve. Only the mounting space parallel to the conduit pipe is required for the application of an axial upsetting force. A damaging or deformation of the metal pipe can be excluded because the pressure bushing is guided radially inside of the sleeve such that an escaping toward the inside against the metal pipe can be excluded. In addition, the required upsetting forces can be kept to relatively low values such that simple tongs formed like a U around the metal pipe are sufficient to generate the pipe connection. In addition, the pipe connection according to the invention can be produced extremely economically and comprises only two parts not considering the metal pipes.

The pipe connection comprises a first conically flared metal pipe with a flare, a second conically flared metal pipe with a flare and a pressure bushing. The pressure bushing is in part provided with a relatively thin wall in radial direction and has a set deformation zone. The pressure bushing is slid onto the first metal pipe up to resting at the flare of the first pipe. A sleeve is provided with an axially fixed annular channel. The second conically flared metal pipe is sealingly set into said sleeve. There is provided a sealing seat surrounding the flares of the first and second pipe. The contact pressure of the flare of the first pipe against the sealing seat is generated in axial direction by said set deformation zone of the pressure bushing. The relatively thin wall of the pressure bushing is radially deformable into the axially fixed annular channel of the sleeve by an axial upsetting of the pressure bushing into the sleeve.

The flare of the first pipe and the flare of the second pipe can each have a bore cone resting against each other under a compression force of the locking of the sleeve and of the pressure bushing, each resting against a respective flare.

Preferably, the thin-walled pipes are braking lines, fuel lines, or hydraulic lines for transport vehicles. The thin-walled pipes can conform to the flare standard ISO 4038.

The annular channel of the sleeve can be fixed against the compression direction relative to the end of the radial predefined deformation zone. The annular channel of the sleeve can protrude in contrast in a compression direction toward the flares the radial set deformation zone by a free section.

Preferably, the annular channel of the sleeve protrudes in operating position of the pressure bushing in a compression direction toward the flares up to such a section of the pressure bushing, which section cannot be radially deformed.

The radially deformable set deformation zone of the pressure bushing can exhibit an unequal thickness course in the sense that a thinnest wall thickness is present at the end of the radial set deformation zone as compared to the wall thickness in the region of the free section of the annular channel of the sleeve.

According to a further aspect of the invention, a set can be provided for making a pipe connection with thin-walled, small-diameter metal pipes. A first conically flared metal pipe with a flare can be joined with a second conically flared metal pipe with a flare. The set can comprise a pressure bushing. This pressure bushing can be in part provided with a relatively thin wall in radial direction and have a set deformation zone, for sliding onto the first metal pipe up to resting at the flare of the first pipe. A sleeve can be provided with an axially fixed annular channel. This sleeve can provide a seat for the second conically flared metal pipe. Preferably, a sealing seat for surrounding the flares of the first and second pipe such that the contact pressure of the flare of the first pipe against the sealing seat can be generated in axial direction by said set deformation zone of the pressure bushing. The relatively thin wall of the pressure bushing can be radially deformed into the axially fixed annular channel of the sleeve by an axial upsetting of the pressure bushing into the sleeve.

Preferably, the method for making a pipe connection for thin-walled, small-diameter metal pipes comprises sliding a pressure bushing, which can in part be provided with a relatively thin wall in radial direction and have a set deformation zone, onto a first conically flared metal pipe with a flare up to resting at the flare of the first pipe. A second conically flared metal pipe with a flare can be sealingly set into a sleeve provided with an axially fixed annular channel. The flares of the first and second pipe can be surrounded with a sealing seat. Preferably, a contact pressure of the flare of the first pipe is generated against the sealing seat in an axial direction by said set deformation zone of the pressure bushing. The pressure bushing can be axially upset into the sleeve. The relatively thin wall of the pressure bushing can be radially deformed into the axially fixed annular channel of the sleeve.

According to a further feature of the invention, the annular channel of the sleeve can be fixed against the compression direction relative to the end of the radial set deformation zone, while the radial set deformation zone protrudes by a free section in the compression direction. This independent feature of the invention places the metal pipe flare under a pretension such that upon decrease and lowering of the pressure force of the sealing seat, the thin-walled or, respectively, predefined deformation zone becomes elastically effective and the pressure force is continuously controlled, i.e. the pressure force is continuously maintained.

According to a further aspect of the invention, it is provided that the annular channel of the sleeve protrudes in operating position of the pressure bushing in the compression direction up to a section of the pressure bushing, which section cannot be radially deformed. Based on this, the pressure bushing remains securely guided in the inner space of the sleeve despite the expansion of the annular channel. On the other hand, the start of the set deformation zone is free in order to be able to follow also in case of a shifting of the metal pipe flare.

According to a further improvement of the invention, it is provided that the radially deformable predefined deformation zone of the pressure bushing is provided with a non-uniform course of thickness in the sense that the thinnest wall thickness is present at the end of the radial set deformation zone as compared to the wall thickness in the region of the free section of the annular channel of the sleeve. This construction feature is aimed at achieving a particularly strong spring-elastic effect of the smaller wall thickness in the region of the flare and thus to generate an increase in the pretensioned compression force.

While the invention allows the connection of a tube via the sleeve with a metal pipe, there is also present a useful field of application for the connection of two metal pipes. It is provided in this context that a first, single-conically flared metal pipe is sealingly inserted with its outer cone into the hollow inner cone of a second double-conically flared metal pipe, where the outer cone of the metal pipe rests sealingly pressed into the bore cone of the sleeve. Correspondingly, the sealing seat between the conically flared metal pipes is formed via the compression force of the pressure bushing.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 4 is an axial longitudinal sectional view of a second embodiment of a metal pipe with a double-conic flare, which flare is inserted into the sleeve;

FIG. 5 is an axial longitudinal sectional view of the second conically flared metal pipe with the pressure bushing slid on; and FIG. 6 is an axial longitudinal sectional view of the two flared metal pipes, the sleeve, and the upset pressure bushing according to FIGS. 4 and 5.

DESCRIPTION OF INVENTION AND PREFERRED EMBODIMENT

Figure 1:
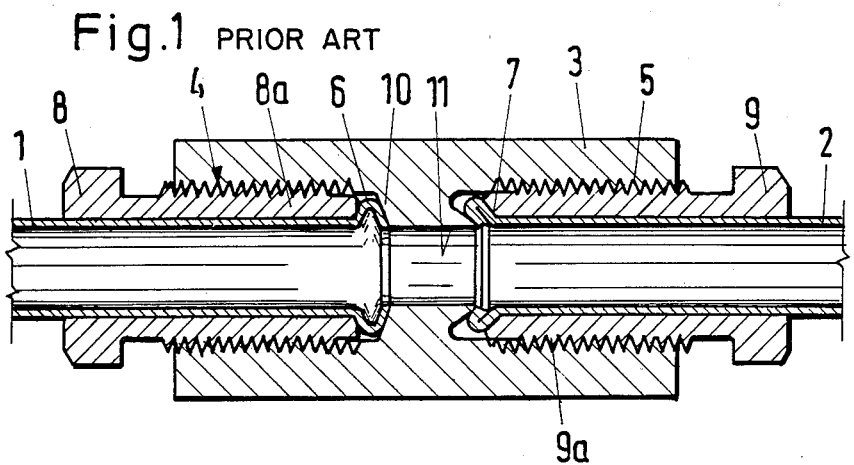
FIG. 1 is a schematic view of a conventional pipe screw connection, illustrated in an axial longitudinal cross-section.

In accordance with the invention, there is provided a pipe connection for thin-walled, small-diameter metal pipes in particular for braking lines, for fuel lines, and for hydraulic lines for motor vehicles. At least one first conically flared metal pipe with a flare, such as according to ISO 4038, is sealingly set into a sleeve and into a bore cone under the compression force of a tensioning body resting against the flare. The sleeve 12 is provided with an axially fixed annular channel 18 and a pressure bushing 15, which is in part provided with a relatively thin wall in radial direction, is slid onto the first metal pipe 1 up to resting at the flare 23. The contact pressure of the flare 23 against the sealing seat 14 can be generated in axial direction by a set deformation zone 20 of the pressure bushing 15. The thin wall 21 can be radially deformed into the axially fixed annular channel 18 of the sleeve 12 by an axial upsetting of the pressure bushing into the sleeve 12.

The annular channel 18 of the sleeve 12 can be fixed against the compression direction 26 relative to the end 27 of the radial set deformation zone 20. The annular channel 18 of the sleeve 12 can in contrast protrude in a compression direction 26 the radial set deformation zone 20 by a free section 28.

The annular channel 18 of the sleeve 12 can protrude in operating position of the pressure bushing 15 in a compression direction 26 up to a section 29 of the pressure bushing 15, which section 29 cannot be radially deformed.

The radially deformable set deformation zone 20 of the pressure bushing 15 can exhibit an unequal thickness course 30 in the sense that a thinnest wall thickness 31 is present at the end 27 of the radial set deformation zone 20 as compared to the wall thickness 21 in the region of the free section 28 of the annular channel 18 of the sleeve 12.

A first single-conically flared metal pipe 1 can sealingly rest with its outer cone 32 in the hollow inner cone 33 of a second double-conically flared metal pipe 2, where the outer cone 34 of the double-conically flared metal pipe 2 is disposed sealingly pressed into the bore cone 25 of the sleeve 12.

The conventional pipe connection according to FIG. 1 requires, for connecting a first conically flared metal pipe 1 with a second conically flared metal pipe 2, a sleeve 3, which is provided with the internal thread sections 4 and 5. The flares 6 and 7, in each case, are pressed by special tensioning bodies 8 and 9, which are in this case screw connections, against the sealing seats 10 and 11. Apart from the more difficult access of the tensioning bodies 8 and 9, the screw connections 8a and 9a, as well as the thread sections 4 and 5, are economically expensive.

Figure 2:
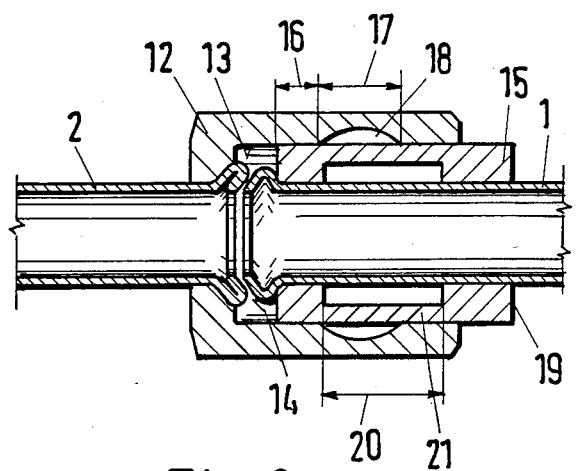
FIG. 2 is an axial longitudinal sectional view of a first embodiment of the invention, where the pressure bushing is illustrated in the mounting position.

In accordance with the present invention, there is provided a pipe connection for thin-walled, small-diameter metal pipes in particular for braking lines, fuel lines, and hydraulic lines for motor vehicles which is of a substantially simpler construction. According to the first embodiment of the invention illustrated in FIGS. 2 and 3, there is required, in contrast to the conventional pipe connection, only a sleeve 12 with a smooth inner bore 13. A first conically single-flared metal pipe 1, as well as a second conically double-flared metal pipe 2, jointly form a sealing seat 14 which will be described in more detail below. The sleeve 12 receives a pressure bushing 15 in the inner bore 13. The sleeve 12 is in addition provided with an annular channel 18 having a predetermined distance 16 and a predetermined width 17. The wall thickness 19, within a set deformation zone 20, is reduced to a thin wall 21 within the pressure bushing 15.

Figure 3:
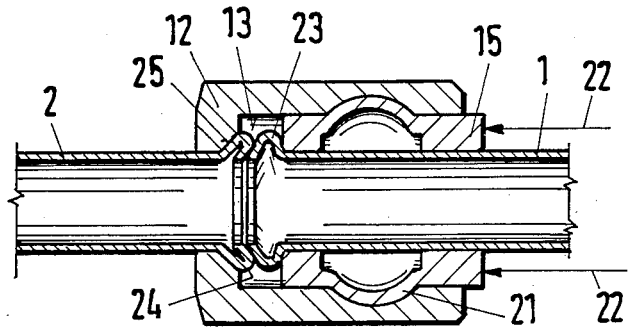
FIG. 3 is an axial longitudinal cross-sectional view of the embodiment according to FIG. 2 after the upsetting of the pressure bushing.

Referring now to FIG. 3, there is shown the connection in an assembled state. The pressure bushing 15 is pressed with the front face against the flare 23 of the first metal pipe 1 by applying of an axial upsetting force 22. Thus, the flare 23 of the first metal pipe 1 presses the flare 24 of the second metal pipe 2 into the bore cone 25 of the sleeve 12 and thereby forms the sealing seat 14. The fixation of this state is achieved by the deforming of the thin wall 21 into the annular channel 18 where, according to FIG. 3, the annular channel 18 is being completely filled. The upsetting process effects in one single pressure stroke a centering, a pressing, and a fixing in position of the metal pipes 1 and 2.

According to a second embodiment illustrated in FIGS. 4 to 6, the annular channel 18 of the sleeve 12 is fixed against the pressure direction 26 relative to the end 27. In contrast, the free section 28 protrudes in pressure direction 26 the radial set deformation zone 20. In this case, the annular channel 18 ends outside of the set deformation zone 20 about in the middle of the standard wall thickness 19 of the pressure bushing 15. This section 29 of the pressure bushing 15 cannot be radially deformed.

It is furthermore advantageous if the thin wall 21 does not have a uniform thickness, as is illustrated in FIG. 5, but is instead of a non-uniform thickness, as shown in FIG. 6. Such a non-uniform course of the thickness 30 is indicated in FIG. 6 and, in fact, the thinnest wall section 31 is disposed at the end 27 of the radial set deformation zone 20. In contrast, the largest wall thickness 21 is provided in the region of the free section 28 of the annular channel 18 of the sleeve 12.

The invention can further be employed with only the first single-conically flared metal pipe, where the outer cone 32 is sitting in the bore cone 25 of the sleeve 12. This case is to be applied if a tube has to be connected in a conventional manner on one side of sleeve 12.

According to the two embodiments, the outer cone 32 of the metal pipe 1 is resting sealingly in a hollow inner cone 33 of a second double-conically flared metal pipe 2. For this purpose, an outer cone 34 of the metal pipe 2 rests in the bore cone 25 of the sleeve 12 sealingly pressed by the pressure bushing 15.

The axial length of the sleeve 12 is preferably from about 0.9 to 1.3 times the axial length of the pressure bushing 15, and preferably from about 1.0 to 1.2 times the axial length of the pressure bushing 15 in a rest position. The contraction of the pressure bushing 15 in axial direction, based on the thin wall section, can amount to from about 0.1 to 0.5 times the length of the thin wall section, and preferably from about 0.2 to 0.4 times the length of the thin wall section. The annular channel of the sleeve 12 can have an axial length corresponding to 0.8 to 1.0 times the axial length of the thin wall section. The depth of the annular channel can be from about 0.3 to 0.7 of the wall thickness of the sleeve 12 and is preferably from about 0.4 to 0.6 of the wall thickness of the sleeve 12. Preferably, the section of the sleeve and of the pressure bushing resting against the respective pipe flares are provided with a conical section where the cone angle corresponds to about ±20% of the cone angle of the respective flare. The outer diameter of the pressure bushing can be from about 1.3 to 2.0 times the thickness of the pipe to be connected and is preferably from about 1.5 to 1.8 times the thickness of the pipe to be connected. The outer diameter of the sleeve can be from about 2 to 3 times the diameter of the pipe to be connected and is preferably from about 2.2 to 2.6 times the diameter of the pipe to be connected. The annular channel is preferably formed substantially as a cylinder having a cross-section corresponding to a circle segment.

The thickness of the thinnest section of the set deformation zone 20 of the pressure bushing 15 can have a thickness which is reduced from the thickness disposed closest to the flares by up to about 50% on the end side disposed remote from the flares. The length of the set deformation zone 20 of the pressure bushing 15 can be from about 0.5 to 2.0 times the diameter of the pipe and is preferably from about 0.8 to 1.3 times the diameter of the pipe to be connected. The distance of the annular channel of the sleeve 12 from the attachment point of the sleeve 12 near the flare of the double-flared pipe and can be from about 0.5 to 2.0 times the diameter of the pipe and is preferably from about 0.8 to 1.3 times the diameter of the pipe to be connected. The sections of the pressure bushing 15 resting directly against the pipe can each have an axial length which corresponds to about 0.3 to 1.0 times the diameter of the pipe 1 and is preferably from about 0.4 to 0.7 times the diameter of the pipe 1. The length of contact of the sleeve 12 in axial direction at the respective attached pipe 1 can be from about 0.3 to 1.0 times the diameter of said pipe and is preferably from about 0.4 to 0.7 times the diameter of said pipe 2. The inner diameter of the sleeve 12 preferably corresponds to 0.90 to 1.05 of the outer diameter of the pressure bushing 15 and preferably from about 0.98 to 1.0 times the outer diameter of the pressure bushing 15. The pressure bushing 15 can be formed out of an elastically permanently deformable material, such as sheetmetal or plastic. The sleeve 12 can be formed by a solid material such as, for example, plastic or metal.

It will be understood that each of the elements described above, or two or more together, may also find a useful application in other types of pipe connections for thin-walled, small-size metal pipes differing from the types described above.

While the invention has been illustrated and described as embodied in the context of a pipe connection for thin-walled, small-size metal pipes, in particular for brake lines, fuel lines, and hydraulic lines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pipe connection for thin-walled, small-diameter metal pipes comprising a first conically flared metal pipe with a flare;
a second conically flared metal pipe with a flare;
a pressure bushing, which is in part provided with a relatively thin wall in radial direction and having a set deformation zone, is slid onto the first metal pipe up to resting at the flare of the first pipe;
a sleeve provided with an axially fixed annular channel into which sleeve the second conically flared metal pipe is sealingly set;
a sealing seat surrounding the flares of the first and second pipe wherein the contact pressure of the flare of the first pipe against the sealing seat is generated in axial direction by said set deformation zone of the pressure bushing, whereby the relatively thin wall of the pressure bushing is radially deformable into the axially fixed annular channel of the sleeve by an axial upsetting of the pressure bushing into the sleeve.

2. The pipe connection for thin-walled, small-diameter metal pipes according to claim 1 wherein the flare of the first pipe and the flare of the second pipe have each a bore cone resting against each other under a compression force of the locking of the sleeve and of the pressure bushing, each resting against a respective flare.

3. The pipe connection for thin-walled, small-diameter metal pipes according to claim 1 wherein the thin-walled pipes are braking lines for transport vehicles.

4. The pipe connection for thin-walled, small-diameter metal pipes according to claim 1 wherein the thin-walled pipes are fuel lines for transport vehicles.

5. The pipe connection for thin-walled, small-diameter metal pipes according to claim 1 wherein the thin-walled pipes are hydraulic lines for transport vehicles.

6. The pipe connection for thin-walled, small-diameter metal pipes according to claim 1 wherein the thin-walled pipes conform to flare standards.

7. The pipe connection for thin-walled, small-diameter metal pipes according to claim 1 wherein the annular channel of the sleeve is fixed against the compression direction relative to the end of the radial predefined deformation zone, and wherein the annular channel of the sleeve protrudes in contrast in a compression direction toward the flares the radial set deformation zone by a free section.

8. The pipe connection for thin-walled, small-diameter metal pipes according to claim 1 wherein the annular channel of the sleeve protrudes in operating position of the pressure bushing in a compression direction toward the flares up to such a section of the pressure bushing, which section cannot be radially deformed.

9. The pipe connection for thin-walled, small-diameter metal pipes according to claim 8 wherein the radially deformable set deformation zone of the pressure bushing exhibits an unequal thickness course in the sense that a thinnest wall thickness is present at the end of the radial set deformation zone as compared to the wall thickness in the region of the free section of the annular channel of the sleeve.

10. A set for making a pipe connection with thin-walled, small-diameter metal pipes, where a first conically flared metal pipe with a flare and a second conically flared metal pipe with a flare are joined, comprising
a pressure bushing, which is in part provided with a relatively thin wall in radial direction and having a set deformation zone, for sliding onto the first metal pipe up to resting at the flare of the first pipe;
a sleeve provided with an axially fixed annular channel which sleeve provides a seat for the second conically flared metal pipe;
a sealing seat for surrounding the flares of the first and second pipe such that the contact pressure of the flare of the first pipe against the sealing seat can be generated in axial direction by said set deformation zone of the pressure bushing, whereby the relatively thin wall of the pressure bushing is to be radially deformed into the axially fixed annular channel of the sleeve by an axial upsetting of the pressure bushing into the sleeve.

11. The set for making a pipe connection for thin-walled, small-diameter metal pipes according to claim 10 wherein the first single-conically flared metal pipe is formed for resting sealingly with its outer cone in the hollow inner cone of the second flared metal pipe, where the flare of the second metal pipe is double-conically flared, where the outer cone of the double-conically flared metal pipe is to be disposed sealingly pressed into the bore cone of the sleeve.

12. A method for making a pipe connection for thin-walled, small-diameter metal pipes comprising
   sliding a pressure bushing, which is in part provided with a relatively thin wall in radial direction and having a set deformation zone, onto a first conically flared metal pipe with a flare up to resting at the flare of the first pipe;
   sealingly setting a second conically flared metal pipe with a flare into a sleeve provided with an axially fixed annular channel;
   surrounding the flares of the first and second pipe with a sealing seat;
   generating a contact pressure of the flare of the first pipe against the sealing seat in an axial direction by said set deformation zone of the pressure bushing;
   axially upsetting the pressure bushing into the sleeve; and radially deforming the relatively thin wall of the pressure bushing into the axially fixed annular channel of the sleeve.

13. The method for making a pipe connection for thin-walled, small-diameter metal pipes according to claim 12 further comprising
   fixing the annular channel of the sleeve against the compression direction relative to the end of the radial predefined deformation zone; and
   positioning the annular channel of the sleeve for protruding, in a compression direction toward the flares, the radial set deformation zone by a free section.

14. The method for making a pipe connection for thin-walled, small-diameter metal pipes according to claim 12 further comprising
   positioning the annular channel of the sleeve for protruding in operating position of the pressure bushing in a compression direction toward the flares up to such a section of the pressure bushing, which section cannot be radially deformed.

15. The method for making a pipe connection for thin-walled, small-diameter metal pipes according to claim 12 further comprising
   providing the radially deformable set deformation zone of the pressure bushing with an unequal thickness course in the sense that a thinnest wall thickness is present at the end of the radial set deformation zone as compared to the wall thickness in the region of the free section of the annular channel of the sleeve.

16. A pipe connection for thin-walled, small-diameter metal pipes in particular for braking lines, for fuel lines, and for hydraulic lines for motor vehicles, where at least one first conically flared metal pipe with a flare, is sealingly set into a sleeve and into a bore cone under the compression force of a tensioning body resting against the flare, comprising
   a sleeve 12 provided with an axially fixed annular channel 18 and a pressure bushing 15, which is in part provided with a relatively thin wall in radial direction, is slid onto the first metal pipe 1 up to resting at the flare 23, and wherein the contact pressure of the flare 23 against the sealing seat 14 can be generated in axial direction by a set deformation zone 20 of the pressure bushing 15, whereby the thin wall 21 is radially deformable into the axially fixed annular channel 18 of the sleeve 12 by an axial upsetting of the pressure bushing into the sleeve 12.

17. Pipe connection according to claim 16, wherein the annular channel 18 of the sleeve 12 is fixed against the compression direction 26 relative to the end 27 of the radial set deformation zone 20, and wherein the annular channel 18 of the sleeve 12 protrudes in contrast in a compression direction 26 the radial set deformation zone 20 by a free section 28.

18. Pipe connection according to claim 16, wherein the annular channel 18 of the sleeve 12 protrudes in operating position of the pressure bushing 15 in a compression direction 26 up to a section 29 of the pressure bushing 15, which section 29 cannot be radially deformed.

19. Pipe connection according to claim 18, wherein the radially deformable set deformation zone 20 of the pressure bushing 15 exhibits an unequal thickness course 30 in the sense that a thinnest wall thickness 31 is present at the end 27 of the radial set deformation zone 20 as compared to the wall thickness 21 in the region of the free section 28 of the annular channel 18 of the sleeve 12.

20. Pipe connection according to claim 19, wherein a first single-conically flared metal pipe 1 rests sealingly with its outer cone 32 in the hollow inner cone 33 of a second double-conically flared metal pipe 2, where the outer cone 34 of the double-conically flared metal pipe 2 is disposed sealingly pressed into the bore cone 25 of the sleeve 12.

* * * * *